United States Patent Office 2,718,489
Patented Sept. 20, 1955

2,718,489

ACTIVATION OF ION EXCHANGE MATERIAL AND PROCESS FOR SWEETENING PETROLEUM THEREWITH

Harry L. Coonradt, Woodbury, and Wilbur K. Leaman, Pitman, N. J., assignors to Socony Mobil Oil Company, Inc., a corporation of New York No Drawing. Application September 19, 1951, Serial No. 247,372

14 Claims. (Cl. 196—24)

The present invention relates to the activation of ion exchange materials for treatment of non-aqueous fluids and, more particularly, to the activation of ion exchange materials for treatment of hydrocarbon mixtures. The present invention provides a means for activation of both cationic and anionic exchange resins, particularly anionic exchange resins and, more particularly, anion exchange resins of the strongly basic type or class.

Anion exchange materials have been used in the treatment of hydrocarbons and have been regenerated by the use of aqueous alkali solutions and where cation exchange materials have been used, they have been regenerated with aqueous solutions of mineral acids. (F. C. Nachod, "Ion Exchange" New York, Academic Press, Inc., 1949, U. S. Patent No. 2,367,803 and U. S. Patent No. 2,341,329.) However, while such methods of regeneration are at least partially satisfactory, in some respects they leave much to be desired. This is particularly true, for example, in the use of anion exchange resins for the removal of mercaptans from hydrocarbon mixtures such as gasoline and the like.

It has been found that mercaptans can be removed from hydrocarbon mixtures such as gasoline, naphtha, kerosene, etc., by percolation through a strongly basic anion exchange resin, and that the sorbed mercaptans can be eluted from the ion exchange material with a large molar excess of dilute aqueous caustic solution. Such a method is feasible and operable.

An improved method of regenerating ion exchange materials is described in copending application Serial No. 247,371, filed September 19, 1951, in the names of Harry L. Coonradt and Wilbur K. Leaman, which involves contacting the ion exchange material exhausted or partially exhausted with ionic materials, such as mercaptans, with a solvent for mercaptans, such as aqueous alkali metal hydroxide solution containing 2 to about 15 per cent alkali metal hydroxide and, while the exchange material and sorbed mercaptans are submerged in the alkali metal hydroxide solution, passing air through the mass to convert the ionic mercaptans to substantially non-ionic polysulfides substantially insoluble in the aqueous alkaline solution. In this regeneration, the oxygen of the air is the agent which converts the ionic mercaptans to the non-ionic polysulfides.

The limiting factor in the sorption of ionic materials by ion exchange resins is the limited capacity of the various ion exchangers. For example, one anion exchange material available at the present time has a capacity limited to the treatment of only 11 volumes of gasoline containing 0.10 weight per cent mercaptan sulfur per volume of exchange material. Furthermore, the effluent gasoline has the rather high mercaptan sulfur content of about 0.004 weight per cent. In addition, the use of unactivated anion exchange material is not particularly successful in certain cases since the higher molecular weight mercaptans $C_8$—$C_{13}$, such as are found in a kerosene fraction, are not as readily extracted by unactivated anion exchange material from the hydrocarbon mixture in which the mercaptans are present.

It has now been discovered that these deficiencies can be overcome and fresh or regenerated ion exchange material activated to provide a more effective medium for the extraction of ionic constituents of non-aqueous systems. For example, the present invention provides a means for activating ion exchange materials and also an improvement in the methods of removing mercaptans, for example, from mixtures of hydrocarbons such as petroleum fractions.

The present invention, therefore, has as its purpose a novel method of activating fresh or regenerated ion exchange resin. Activation of fresh or regenerated ion exchange resin is achieved in accordance with the principles of the present invention by contacting, i. e., by submersion or by percolation or by any other suitable means, fresh or regenerated exchange material with one or a mixture of the lower molecular weight monohydric alcohols such as methanol, ethanol, isopropanol, n-propanol, butanol, pentanol, or in general the aliphatic monohydric alcohols having 1 to 5 carbon atoms. Of these monohydric alkanols, methanol and ethanol are particularly preferred for economic reasons.

The advantages of the present novel method of activation of the ion exchange material prior to its use in removing ionic constituents from non-aqueous or hydrocarbon media can be illustrated by reference to the use of ion exchange resin to remove mercaptans from hydrocarbon fluids such as gasoline or kerosene. First, the method of activation produces an ion exchange resin which is more efficient in the removal of sulfur from gasoline as is evidenced by the fact that the residual mercaptan sulfur of gasoline treated with "activated" anion exchange material was 0.0002 weight per cent while the residual mercaptan content of gasoline treated with unactivated anion exchange material under substantially the same conditions was 0.004 weight per cent or 2000 per cent that of the gasoline treated with activated anion exchange material. Second, the capacity of a given volume of exchange material for the removal of acidic constituents, particularly mercaptans, is greatly increased; for example activated anion exchange material has approximately 340 per cent the capacity to extract mercaptans that unactivated anion exchanger has. Third, anion exchange material activated as described hereinafter will effect extractions which cannot be effected with unactivated exchange material. For example, unactivated anion exchange material will not remove mercaptans from kerosene which activated anion exchange material will remove.

Suitable procedures for using an anion exchange resin include the following. When starting with fresh anion exchange material which is received from the supplier in the form of a salt of a strong acid, for example as the chloride, the exchange material is treated with an aqueous solution of an alkali metal hydroxide. It has been found that treating one volume of exchange material in the chloride form with 40 volumes of 4 per cent aqueous sodium hydroxide solution converts the exchange material (for example, Rohm and Haas "Amberlite IRA-400") to the hydroxyl form.

When starting with the exhausted or partially exhausted anion exchange resin, it is first regenerated, preferably as described hereinbefore.

An anion exchange material in the hydroxyl form is washed, when desirable or necessary, with water which is itself substantially free from anions until the washings are neutral. However, absolute neutrality is not essential. The exchange material is then ready for the treatment of non-aqueous solutions. However, greater efficiency of extraction can be obtained by activating the exchange resin with a monohydric alkanol having 1 to 5 carbon atoms as described hereinbefore.

When cation exchange material is exhausted or partially exhausted the exchange resin is regenerated. The regenerated cationic exchange resin is then activated by treatment with a monohydric alkanol or a mixture of monohydric alkanols having 1 to 5 carbon atoms.

Activation of fresh cationic exchange resins is likewise obtained by treatment with a monohydric alkanol having 1 to 5 carbon atoms.

Illustrative of the use, regeneration and activation of ion exchange resins are the following non-limiting examples.

EXAMPLE I

About 1 volume of Rohm and Haas "Amberlite IRA-400" resin was placed in a cylindrical container and about 50 volumes of 4 per cent aqueous sodium hydroxide percolated therethrough to convert the exchange material from the chloride form in which the manufacturer ships it to the hydroxyl form. The converted anion exchange material, i. e., exchange material in the hydroxyl form, was then washed using distilled water until the washings were neutral. (Undistilled water substantialy devoid of anions is also suitable.) The water washed exchange material was then treated with about 1.5 volumes of caustic washed gasoline which was substantially void of mercaptans and this gasoline displaced by percolating about one-half volume of sour gasoline (containing 0.15 weight per cent mercaptan sulfur) through the exchange material. The exchange material was then used to remove mercaptans from gasoline.

Sour gasoline containing 0.15 weight per cent mercaptan sulfur was percolated through the bed of anion exchange material at a liquid space velocity of 4. (A liquid space velocity of 4 is attained when 4 volumes of gasoline are passed through one volume of exchange material per hour.) The first 5 volumes of effluent gasoline was found to contain 0.003 weight per cent mercaptan sulfur. (This analysis, as well as all others for mercaptans reported herein was made by potentiometric titration.) The percolation of this sour gasoline was continued until the effluent gasoline contained at least above 0.01 weight per cent mercaptan sulfur. When the mercaptan sulfur content of the effluent gasoline is of the order of 0.01 weight per cent or the reduction of the marcaptan content of the gasoline is less than 90 per cent the exchange material is considered exhausted. The exhausted exchange material was drained of gasoline and backwashed with water substantially free from anions. The exchange material was then regenerated by passing 50 volumes of aqueous 4 per cent caustic soda solution through the exhausted exchange material to regenerate the exchange material. The regenerated exchange material was then water washed until the washings were neutral. The water was replaced by percolating 1.5 volumes of caustic washed gasoline through the bed of regenerated exchange material and this gasoline replaced with sour gasoline. A second cycle of exhaustion was then begun. The first 5 volumes of effluent gasoline of the second cycle contained 0.004 weight per cent mercaptan sulfur.

EXAMPLE II

To demonstrate the effect of activation by treatment with a low molecular weight alkanol one volume of resin identical to that used previously was converted to the hydroxyl form and water washed. After water washing the exchange material in the hydroxyl form, about 5 volumes of ethanol were passed through the water washed exchange material and then the exchange material bed was backwashed with ethanol. The alcohol was displaced from the bed with 1.5 volumes of caustic washed gasoline which in turn was displaced with one-half volume of sour gasoline. The bed was then ready for use.

Sour gasoline containing 0.12 weight per cent mercaptan sulfur was percolated through the bed of exchange material activated by treatment with ethanol, as described hereinbefore, at a space velocity of 4. The first 5 volumes of effluent gasoline contained 0.0002 weight per cent mercaptan sulfur.

After exhaustion of the exchange material, i. e., when the effluent gasoline contained more than 0.01 weight per cent mercaptan sulfur, the exchange material was regenerated, as described hereinbefore, with an excess of an aqueous solution of an alkali metal hydroxide and again activated by treatment with an alkanol, ethanol. The ethanol was displaced with sweet gasoline and the sweet gasoline displaced with sour gasoline. A second cycle of exhaustion of the exchange material was then begun. The first 5 volumes of effluent gasoline contained 0.0002 weight per cent mercaptan sulfur.

A comparison of the effect of activation and non-activation of ion exchange material is provided in Table I.

Table I

| Example | Cycle | Activator Used | Original Percent RSH-S [1] | Percent RSH-S in First 5 Volumes of Effluent |
| --- | --- | --- | --- | --- |
| 1 | 1 | None | 0.15 | 0.003 |
|   | 2 | do   | 0.15 | 0.004 |
| 2 | 1 | Ethanol | 0.12 | 0.0002 |
|   | 2 | do   | 0.12 | 0.0002 |

[1] Percent RSH-S = wt. percent mercaptan sulfur.

These data show, in addition to the increased efficiency resulting from activation of the exchange material, that the usefulness of any proposed activator can be demonstrated on fresh exchange materials with only one cycle of exhaustion thereby eliminating the regeneration steps when testing other materials as activators, and thus saving an appreciable amount of time.

In the following tabulation, data are presented establishing the activating capabilities of various classes of organic solvents. One volume of fresh Rohm and Haas "Amberlite XE-75" in the hydroxyl form was used for each test after being prepared as described hereinbefore.

Table II

| Example No. | Activator | Percent RSH-S of Influent | Percent RSH-S of Effluent |
| --- | --- | --- | --- |
| 3 | None | 0.17 | 0.001 |
| 4 | None [1] | 0.17 | 0.0001 |
| 5 | Ethanol [2] | 0.17 | 0.0001 |
| 6 | Methanol | 0.17 | 0.0002 |
| 7 | Isopropanol | 0.17 | 0.0004 |
| 8 | Acetone | 0.17 | 0.032 |
| 9 | Methyl-ethyl ketone | 0.17 | 0.11 |
| 10 | Isopropyl ether | 0.17 | 0.006 |
| 11 | Isopropyl acetate | 0.17 | 0.16 |
| 12 | Ethyl acetate | 0.17 | 0.19 |
| 13 | Dioxane | 0.17 | 0.07 |
| 14 | Ethylene glycol | 0.12 | 0.03 |

[1] Exchange material converted to hydroxyl form by using 4 percent alcoholic sodium hydroxide.
[2] Government Formula 30 (10 percent methanol added to 95 percent ethanol).
First 2.5 volumes of effluent discarded; next 5 volumes of effluent analyzed for RSH-S. Hourly space velocity 4.

It will be noted that all of the materials tested as activators were ineffective except the lower molecular weight alkanols. By comparison of the results of Examples 8 through 14 with the result of Example 1, it is manifest that in all instances the organic material instead of acting as an activator actually acted as a deactivator compared with water. Thus, it is manifest that the lower molecular weight alkanols, i. e., those monohydric alcohols having 1 to 5 carbon atoms in the molecule, are unique.

Another advantage derived from activation of the exchange material is increased capacity. For the purpose of this determination, an exchange material is said to be exhausted and require regeneration when the mercaptan sulfur content of the effluent gasoline reaches 0.005 weight per cent. The increased capacity of activated exchange material is demonstrated by the data presented in Table III. These data were obtained using one volume of Rohm and Haas "Amberlite XE–75" resin in the hydroxyl form.

Table III

| Activator | Percent RSH–S of Sour Gasoline | Capacity (Volumes) [1] |
|---|---|---|
| None | 0.10 | 11 |
| Ethanol | 0.17 | [2] 22 |
| Do | 0.10 | 37 (cal.) |

[1] Volumes of gasoline treated per volume of exchange material before effluent gasoline contained 0.005 weight percent mercaptan sulfur.
[2] It can be readily calculated that at an influent level of 0.10 weight percent RSH-S the capacity of the ethanol activated exchange material is $\frac{17}{10} \times 22 = 37$.

It has been stated hereinbefore that activation of the exchange material leads to enhanced capability to extract higher molecular weight ($C_8$—$C_{13}$) mercaptans—usually found in kerosene. The data presented in Table IV demonstrate the foregoing.

The data in Table IV were obtained by treating a raw West Texas kerosene having an initial mercaptan sulfur content of 0.0885 weight per cent. The conversion to the hydroxyl form and activation were carried out as described hereinbefore.

Table IV

| Exchange Material | Activator | Percent RSH–S First 5 Volumes of Effluent |
|---|---|---|
| 400 [1] | None | 0.074 |
| 400 | Ethanol | 0.006 |
| 75 [2] | None | 0.074 |
| 75 | Ethanol | 0.002 |

RSH–S of influent kerosene—0.0885 weight percent.
[1] Rohm and Haas "Amberlite IRA–400."
[2] XE–75, a more porous modification of IRA–400.

It will be noted that with both exchange materials the reduction of mercaptan sulfur was slight, about 16 per cent, when the exchange material was not activated. On the other hand, when the exchange material was activated the reduction in mercaptan sulfur content was 93 per cent and 97 per cent, the latter value being for the more porous material.

While the activation of ion exchange resins has been demonstrated by the use of "Amberlite IRA–400" and "XE–75," it will be understood by those skilled in the art that the alkanols can be used to activate other ion exchange materials such as the weak base and the strong and weak acid types of exchange materials.

While the activation of exchange material exhausted by mercaptan removal has served to demonstrate the basic concept, it will be understood that low molecular weight monohydric alkanols can be employed to activate exchange material used for the removal of other acidic or basic compounds from hydrocarbon or non-aqueous media.

It is to be noted that the method of the present invention comprises activating fresh exchange material or activating regenerated exchange material. The present method has several advantages over the use of alcoholic caustic soda solutions for regeneration of exhausted exchange material, which would in effect when used regenerate and activate the resin. For example, larger quantities of alcohol are required for regeneration with alcoholic caustic soda than are required for alcoholic activation. Recovery costs for this large volume of alcohol are excessive. In the removal of mercaptans the presence of alcohol complicates the caustic recovery system. For example, when the alkali is regenerated by air flowing, elevated temperatures are used and consequently much of the alcohol would be lost or an extremely expensive recovery system must be provided. When oxidation of mercaptides to polysulfides is the method of regenerating the alcoholic caustic regenerant, the polysulfide oil produced is more readily soluble in alcohol than in aqueous caustic solution. Consequently, difficulty is encountered and additional processing required.

The present regeneration-activation method of using exchange materials differs markedly from the prior art method wherein exchange materials used to sorb alkaloids are regenerated by successive treatment with aqueous ammonium hydroxide and alcohol. Alkaloids are removed solely from aqueous systems whereas the present method is directed to the regeneration and activation of exchange material for use in non-aqueous systems. In these two methods the alcohol performs entirely different functions. In the treatment of exchange material exhausted with alkaloids, the ammonium hydroxide regenerates the resin but the alkaloids are not soluble in the hydroxide and thus are not removed by it. The alcohol serves the purpose of eluting the alkaloids off the regenerated resin. In contrast, in the present method the sorbed material is essentially removed by the aqueous alkali before the alcohol is brought into contact with the resin. If it were merely a matter of solution of the sorbed material in the alcohol other solvents for mercaptans such as acetone, methyl-ethyl ketone which have been shown hereinbefore to be worse than water would be as effective as the alcohols. Also, this activation is used on fresh resins which obviously has no connection with removing or eluting off any sorbed material.

It is well known that both anionic and cationic exchange resins are complex in structure. Consequently, no specific structure can be assigned to any particular resin. However, it is possible to distinguish strongly basic from weakly basic ion exchange resins. In general, the commercial ion exchange resins vary considerably as to their basic strength, and this is indicated by titration with hydrochloric acid. ("Ion Exchange Resins," Kunin and Myers, Wiley and Sons (1950), page 40.) For example, a representative weakly basic resin is neutralized in the range of pH of about 7 to 2. The degree of adsorption of a weak acid on a weakly basic ion exchange resin is controlled principally by the ionization constant of the acid ("Ion Exchange," F. C. Nachod, Academic Press, New York (1949), page 70) and can be expressed quantitatively. In general, the weakly basic resins are not sufficiently basic to appreciably neutralize in aqueous solutions such weak acids as silicic acid, carbonic acid, hydrocyanic acid, phenols and the like, whereas the strongly basic resins will neutralize such acids. ("Ion Exchange," F. C. Nachod, page 66 and "Ion Exchange Resins," Kunin and Myers, page 44.)

Typical of the strongly basic anion exchange resins are the resins which can be purchased and are known as "Amberlite IRA–400" and "Amberlite IRA–410" which, according to the manufacturer, can be adequately described as styrene copolymers chloromethylated and aminated to quaternary ammonium hydroxide materials. Other strongly basic anion exchange resins are those available and commercially known as "Dowex 1," and "2" which are quaternary amines with styrene-divinylbenzene nuclei.

In general, a strongly basic ion exchange resin is one which on titration with hydrochloric acid in water free from electrolytes has a pH above about 7.0 when the amount of hydrochloric acid added is one-half of that required to reach the inflection point (equivalence point). A weakly basic ion exchange resin under the same conditions has a pH below about 7.0 when one-half of the acid required to reach the equivalence point has been added.

A strongly acidic ion exchange resin is one which on titration with sodium hydroxide in water free from electrolytes has a pH below about 7.0 when the amount of sodium hydroxide added is one-half of that required to reach the inflection (equivalence) point. A weakly acidic ion exchange resin under the same conditions has a pH above about 7.0 when one-half of the sodium hydroxide has been added to the electrolyte-free water to reach the equivalence point.

Representative of the strongly acidic cation exchange resins are those prepared by the sulfonation with sulfuric acid of the copolymer prepared from styrene and divinylbenzene. U. S. Patents Nos. 2,500,149; 2,466,675; and 2,366,007 are relevant to this class of cation exchange resins. Strongly acidic cation exchange resins can also be prepared by other reactions such as by reacting an aldehyde, a phenol, and a sulfonic acid or sulfite. Typical examples are given in U. S. Patents Nos. 2,518,420; 2,549,745; 2,525,247; and 2,529,602. Typical of these strongly acidic cation exchange resins are those which can be purchased and are known commercially as "Amberlite IR-120" and "Dowex 50," etc.

Typical of the weakly acidic cationic exchange resins are those described in U. S. Patent No. 2,480,970 prepared by the reaction of phthalic anhydride with phenol using an acid catalyst such as surfuric acid in the presence of formaldehyde, and those described in U. S. Patents Nos. 2,340,110 and 2,340,111 comprising a copolymer of a polymerizable mixture of at least one compound having a polymerizable CH=C< grouping and at least one other polymerizable grouping, for example acrylic acid and ethylene dimethacrylate, polymerized in the presence of one per cent benzoyl peroxide as a polymerization accelerator.

Weakly basic anion exchange resins can be prepared by the polymerization of amines such as aniline and metaphenylenediamine with formaldehyde or by condensing phenols, formaldehyde and amines. (U. S. Patents Nos. 2,521,288; 2,485,485; 2,546,938; 2,362,086; 2,442,989; and 2,529,142.) Resins of this type can be purchased and are known commercially as "Amberlite IR-45," "Amberlite IR-4B" and "De Acidite."

We claim:

1. In the removal of weakly acidic organic compounds from hydrocarbon fluids which comprises contacting a hydrocarbon fluid containing weakly acidic organic compounds with an anion exchange resin to sorb said weakly acidic organic compounds on, and to at least partially exhaust said anion exchange resin with said sorbed material, separating said anion exchange resin and sorbed weakly acidic organic compounds from said hydrocarbon fluid, contacting said separated anion exchange resin with an aqueous alkali metal hydroxide solution to dissolve said sorbed weakly acidic organic compounds and to regenerate said anion exchange resin, and contacting hydrocarbon fluid containing weakly acidic organic compounds with said regenerated anion exchange resin, the improvement which comprises contacting said regenerated anion exchange resin with an alkanol having 1 to 5 carbon atoms prior to contacting said regenerated anion exchange resin with said hydrocarbon fluid containing weakly acidic organic compounds and separating said resin from said alkanol.

2. The improvement in the removal of weakly acidic organic compounds from hydrocarbon fluids as set forth and described in claim 1 wherein the hydrocarbon fluid is gasoline.

3. The improvement in the removal of weakly acidic organic compounds from hydrocarbon fluids as set forth and described in claim 1 wherein the hydrocarbon fluid is kerosine.

4. The improvement in the removal of weakly acidic organic compounds from hydrocarbon fluids as set forth and described in claim 1 wherein the hydrocarbon fluid is a petroleum fraction.

5. The improvement in the removal of weakly acidic organic compounds from hydrocarbon fluids as set forth and described in claim 1 wherein the hydrocarbon fluid is a petroleum fraction and the weakly acidic organic compounds are mercaptans.

6. The method of improving the extractive capabilities of anion exchange resin to extract mercaptans from petroleum fractions which consists esentially of contacting anion exchange resin in the hydroxyl form prior to contact with a petroleum fraction containing mercaptans with at least one alkanol having 1 to 5 carbon atoms and separating said resin from said alkanol.

7. The method of improving the extractive capabilities of anion exchange resin to remove weakly acidic organic material from petroleum fractions as set forth and described in claim 6 wherein the petroleum fraction is a naphtha.

8. The method of improving the extractive capabilities of anion exchange resin to remove weakly acidic organic material from petroleum fractions as set forth and described in claim 6 wherein the petroleum fraction is kerosine.

9. The method of improving the extractive capabilities of anion exchange resin to remove weakly acidic organic material from petroleum fractions as set forth and described in claim 6 wherein the petroleum fraction is kerosine and the alkanol is a mixture of methanol and ethanol.

10. In the regeneration of anion exchange resin used to extract mercaptans from petroleum fractions which comprises contacting anion exchange resin at least partially exhausted by sorbed mercaptans with aqueous alkali metal hydroxide solution to extract said sorbed mercaptans from said anion exchange resin to produce a regenerated anion exchange resin and to obtain an aqueous alkali metal hydroxide solution containing said sorbed mercaptans in the form of mercaptides, and separating said regenerated anion exchange resin from said aqueous alkali metal hydroxide solution containing said mercaptans in the form of mercaptides, the improvement which comprises contacting said regenerated anion exchange resin with an alkanol having 1 to 5 carbon atoms prior to contact with a petroleum fraction containing mercaptans, and separating said resin from said alkanol.

11. The improvement in the method of regenerating anion exchange resin used to extract mercaptans from petroleum fractions as described and set forth in claim 10 wherein the alkanol is methanol.

12. The improvement in the method of regenerating anion exchange resin used to extract mercaptans from petroleum fractions as described and set forth in claim 10 wherein the petroleum fraction is kerosine.

13. In the regeneration of anion exchange resin at least partially exhausted with sorbed mercaptans which comprises contacting anion exchange material at least partially exhausted with sorbed mercaptans with aqueous alkali metal hydroxide solution and gas containing free oxygen to dissolve sorbed mercaptans in said aqueous alkali metal hydroxide solution as mercaptides to convert said mercaptides to substantially non-ionic polysulfides and to provide a regenerated anion exchange resin in the hydroxyl form separating said regenerating anion exchange resin from said aqueous alkali metal hydroxide solution and said substantially non-ionic polysulfides, and contacting a petroleum fraction containing mercaptans with said regenerated resin, the improvement which comprises contacting said regenerated anion exchange resin in the hydroxyl form with at least one alkanol having 1 to 5 carbon atoms prior to contact with a petroleum fraction containing mercaptans, and separating said resin from said alkanol.

14. The improvement in the method of regenerating anion exchange resin at least partially exhausted with sorbed mercaptans as set forth and described in claim 13 wherein the alkanol is a mixture of methanol and ethanol.

References Cited in the file of this patent

UNITED STATES PATENTS

| | | |
|---|---|---|
| 2,364,639 | Maizel | Dec. 12, 1944 |
| 2,398,101 | Lipkin | Apr. 4, 1946 |
| 2,566,559 | Dolnick | Sept. 4, 1951 |
| 2,585,652 | Hartough et al. | Feb. 12, 1952 |

OTHER REFERENCES

Laboratory Manual Amberlite—Ion Exchange Resins, page 9, published by Rohm and Haas Co., Philadelphia, Pa., October 1946.

Amberlite IR–4B—pages 1 and 7, February 1947, published by Rohm and Haas Co., Philadelphia, Pa.

Nachod Ion Exchange—pages 354–361, Academic Press Inc. (New York) (1949).